(12) United States Patent
Paar et al.

(10) Patent No.: US 6,653,370 B2
(45) Date of Patent: Nov. 25, 2003

(54) AQUEOUS BINDERS BASED ON EPOXY RESINS

(75) Inventors: Willibald Paar, Graz (AT); Roland Feola, Graz (AT); Johann Gmoser, Graz (AT); Maximilian Friedl, Gratkorn (AT)

(73) Assignee: Solutia Austria GmbH, Werndorf (AT)

( * ) Notice: Subject to any disclaimer, the term of this patent is extended or adjusted under 35 U.S.C. 154(b) by 110 days.

(21) Appl. No.: 10/002,765

(22) Filed: Nov. 2, 2001

(65) Prior Publication Data

US 2002/0091195 A1 Jul. 11, 2002

(30) Foreign Application Priority Data

Nov. 15, 2000 (AT) ................................................ 1928/00

(51) Int. Cl.$^7$ ............................. C08K 3/20; C08L 63/02
(52) U.S. Cl. ....................... 523/423; 523/406; 523/407; 523/414; 525/526; 525/530; 525/531; 528/103; 528/111; 528/119
(58) Field of Search .................... 523/406, 407, 523/414, 423; 528/103, 111, 119; 525/526, 530, 531

(56) References Cited

U.S. PATENT DOCUMENTS

| 4,370,453 A | | 1/1983 | Omika et al. |
| 5,756,829 A | * | 5/1998 | Meixner .................... 560/209 |

FOREIGN PATENT DOCUMENTS

| DE | 30 41 700 A1 | 6/1982 |
| DE | 33 00 583 A1 | 7/1984 |
| DE | 33 11 513 A1 | 10/1984 |
| DE | 197 11 398 C1 | 6/1998 |
| EP | 0 004 090 A2 | 8/1979 |
| EP | 0 012 463 A1 | 6/1980 |
| EP | 0 249 850 A1 | 12/1987 |

* cited by examiner

*Primary Examiner*—Robert Dawson
*Assistant Examiner*—D. Aylward
(74) *Attorney, Agent, or Firm*—ProPat, L.L.C.

(57) ABSTRACT

Water-dilutable, cationically stabilized epoxy resins ZYX are obtained by reacting, in the first stage, aromatic or aliphatic epoxide compounds Z with aliphatic amines Y to form epoxy-amine adducts ZY which are neutralized and then in aqueous dispersion are reacted in a second stage with a further epoxy resin X. The resins ZYX may be formulated without additional curatives to give aqueous coating materials which exhibit a good corrosion protection effect.

13 Claims, No Drawings

AQUEOUS BINDERS BASED ON EPOXY RESINS

FIELD OF THE INVENTION

The invention relates to aqueous binders based on epoxy resins.

BACKGROUND OF THE INVENTION

In unmodified form, epoxy resins, especially those based on bisphenol A which are customarily used commercially, are very sparingly soluble or insoluble in water. In principle it is possible to obtain water-dilutable, cationically stabilized resins by reacting epoxy resins with amines and then protonating the basic groups. It is also possible, by modifying the epoxy resin with nonionic hydrophilic groups or with anionic groups, to achieve a limited solubility which is sufficient to impart adequate stability to a dispersion of the modified epoxy resin in water. Such dispersions may be diluted with (further) water. By "water-dilutable" is meant here that a dispersion in water does not undergo spontaneous phase separation and also that no macroscopic phase separation occurs on storage at room temperature (23° C.) for at least 7 days. The modified epoxy resin can then be processed from the aqueous dispersion; following removal of the water fraction by evaporation or penetration into the substrate, the resin remains on the surface and, given an appropriate composition of the disperse phase, forms a coalesced film which can be chemically crosslinked by adding appropriate curatives. Since, owing to the ring opening of the epoxide groups, the cationic epoxy-amine adducts of course contain secondary hydroxyl functions, suitable curatives include compounds which enter into addition reactions or condensation reactions with hydroxyl groups, and also oligomers and polymers of this kind, such as melamine resins, phenolic resins and (blocked) polyfunctional isocyanates, for example.

To achieve dilutability in water in the case of the cationically modified epoxy resins, the basic groups of the epoxy-amine adducts are neutralized i.e., converted into the salt form, partially (more than 5%) or fully with acids, such as formic acid, acetic acid or lactic acid, for example. The amount of basic amino groups in the epoxy-amine adduct (measured, for example, by way of the amine number; see below) and the degree of their neutralization (i.e., the fraction of cationic groups) are critical for the extent of dilutability in water.

Cationically stabilized epoxy-amine adducts of this kind are part of the prior art and have already been described many times in the patent literature. In particular in the field of cataphoretic electrodeposition coating, they are employed successfully in combination with blocked difunctional or oligofunctional isocyanates as curative components (see, e.g., EP-A 0 249 850, EP-A 0 004 090, DE-A 30 41 700, DE-A 33 00 583, DE-A 33 11 513). If desired, they are subsequently processed further with crosslinking catalysts, pigments, fillers and other additives to give pigmented paints.

It has now been found that certain water-dilutable epoxy resins, obtainable by an advancement reaction from cationic or cationogenic polyfunctional precursors with diepoxides or polyepoxides, lead without additional curatives to coatings which exhibit good adhesion to metals and mineral substrates and which afford excellent corrosion protection.

Cationogenic compounds are those which on addition of acids are able to form cations in the presence of water.

SUMMARY OF THE INVENTION

The present invention accordingly provides water-dilutable, cationically stabilized epoxy resins ZYX which are obtainable by multistage reaction in which first aromatic or aliphatic epoxide compounds Z having at least one, preferably at least two epoxide groups per molecule are reacted with aliphatic amines Y which contain at least one primary or secondary amino group and, if desired, one or more hydroxyl groups and/or tertiary amino groups to form an epoxy-amine adduct ZY. As component Y it is preferred to use mixtures of amines Y1 containing at least one primary amino group and, if desired, one or more tertiary amino groups and amines Y2 which are free from primary and tertiary amino groups, containing at least one secondary amino group and, if desired, one or more hydroxyl groups. It is likewise possible to react the epoxy resin Z first with an amine Y2 and then with an amine Y1. The epoxy-amine adduct ZY contains at least one, preferably at least two secondary hydroxyl groups and at least one, preferably at least two secondary or tertiary amino groups.

The epoxy-amine adduct ZY is then at least partly neutralized (at least 5% of the basic amino groups are converted into cationic groups) by addition of acid and is then converted into an aqueous dispersion by addition of water with stirring. This dispersion preferably has a mass fraction of solids of from 20 to 60, in particular from 25 to 50%. To this dispersion, which for the purpose is preferably heated to a temperature of at least 40° C., preferably from 50 to 90° C., there is added an epoxy resin X containing at least two epoxide groups per molecule, the amounts of the epoxy resin X and of the epoxy-amine adduct ZY being chosen such that the number of reactive (in respect of addition reaction with an epoxide group) hydroxyl and/or amino groups in ZY is at least the same as that of the epoxide groups in X; preferably, the number of these hydroxyl and/or amino groups ZY is at least 10% greater than that of the epoxide groups in X. For the reaction of X and ZY, the temperature is preferably held at from 70 to 99° C., preferably from 75 to 98° C., until epoxide groups are no longer detectable in the reaction mixture.

DETAILED DESCRIPTION OF THE PREFERRED EMBODIMENT

The epoxy resins Z have at least one, preferably two 1,2-epoxy groups and are aliphatic or aromatic. As monoepoxides it is possible to use glycidyl ethers of monohydric aliphatic or aliphatic-aromatic alcohols; preference is given to the glycidyl ethers of 2-ethylhexanol, decanol, tridecyl alcohol, stearyl alcohol and benzyl alcohol. It is likewise possible to use glycidyl esters of aliphatic or aromatic monocarboxylic acids, such as glycidyl neopentanoate, glycidyl octoate, glycidyl neodecanoate, and also, in particular, the commercially available mixtures of glycidyl esters of branched aliphatic monocarboxylic acids having from 9 to 11 carbon atoms. Of course, mixtures of said glycidyl ethers and glycidyl esters are also suitable. Aliphatic diepoxides are obtainable, for example, by epoxidizing diolefins such as 1,3-butadiene or 1,5-hexadiene, or by reacting epichlorohydrin with dihydroxy compounds such as 1,4-butanediol, 1,6-hexanediol or the oligomeric ethylene or propylene glycols. Aromatic diepoxides are obtainable by reacting dihydroxy aromatics such as resorcinol, dihydroxybiphenyl, dihydroxydiphenyl sulfone or dihydroxybenzophenone with epichlorohydrin. Particular preference is given to reaction products of epichlorohydrin with 2,2-bis(4-hydroxyphenyl) propane or bis (4-hydroxyphenyl)methane (bisphenol A and bisphenol F). In addition to said diepoxides it is also possible to use the glycidyl ethers of trihydric or higher polyhydric alcohols such as trimethylolethane and trimethylolpropane, pentaerythritol, ditrimethylolpropane and dipentaerythritol, and also the ethoxylation and propoxylation products of said alcohols, preference being given to on average at least two and not more than twenty oxyethylene and/or oxypropylene groups for each of the hydroxyl groups of said alcohols. Likewise suitable are glycidyl esters of dibasic or polybasic organic acids, especially of carboxylic acids such as succinic acid, adipic acid, phthalic acid, isophthalic acid and terephthalic acid, trimellitic acid and trimesic acid, and benzophenonetetracarboxylic acid. The specific epoxide group content of the epoxy resins Z used is preferably from 0.5 to 8 mol/kg ("EV value" from 125 to 2000 g/mol), in particular from 1 to 6 mol/kg ("EV value" from 167 to 1000 g/mol).

The specific epoxide group content "SEC" is defined as the ratio of the amount of substance of epoxide groups n(EP) in a sample for analysis to the mass $m_B$ of this sample (and is therefore the reciprocal of the so-called "EV value" or of the so-called "epoxide equivalent weight" (EEW), which are stated in the unit g/mol); the customary (SI) unit is "mol/kg":

$$SEC = n(EP)/m_B$$

The amines Y are aliphatic linear, branched or cyclic amines having from 2 to 40 carbon atoms. The group of the amines Y embraces the amines Y1 containing at least one primary amino group and, if desired, one or more amino groups which are not primary, and the amines Y2 containing at least one secondary amino group and, if desired, one or more hydroxyl groups.

The amines Y1 have at least one primary and, if desired, one or more secondary and/or tertiary amino groups. Preference is given to diamines and triamines or tetramines having two or three primary amino groups, respectively. Particularly suitable diamines are ethylene diamine, 1,2- and 1,3-propylenediamine, 1,4-diaminobutane, 1,6-diaminohexane, diethylenetriamine, triethylenetetramine and the higher oligomeric diaminoethylenamines, 1,2, 1,3- and 1,4-diaminocyclohexane, isophoronediamine and 1, 3-bis (aminomethyl)cyclohexane. Also suitable are primary monoamines and diamines containing tertiary amino groups, containing at least one primary and at least one tertiary amino group and having from 4 to 20 carbon atoms, the alkyl radicals of the tertiary amino group being selected preferably from linear and branched alkyl radicals having from 1 to 4 carbon atoms such as methyl, ethyl, n-propyl, isopropyl, n-butyl, sec-butyl and isobutyl radicals; preference is given to 3-(N,N-dimethylamino)propylamine, 3-(N,N-diethylamino)propylamine, N-(2-aminoethyl)morpholine and N,N'-bis (2-aminoethyl)piperazine and also triamines, e.g., tris(2-aminoethyl)amine. Ethylenediamine, diethylenetriamine and 1,4-diaminobutane, and also N,N-dimethyl- or N,N-diethylaminopropylamine, are particularly preferred.

The amines Y2 have at least one secondary amino group, no primary amino groups, and, if desired, one or more hydroxyl groups. Examples of suitable amines are diethanolamine, diisopropanolamine, N-2-hydroxyethylpiperazine and 2-methylaminoethanol.

Where mixtures of the amines Y1 and Y2 are used, it is preferred to choose their amounts such that the number of aminic hydrogen atoms component Y2 in the mixture is between 50 and 150%, preferably between 75 and 125%, of the number of aminic hydrogen atoms in, component Y1.

To neutralize the adducts ZY, it is preferred to use organic monobasic acids such as formic acid, acetic acid, lactic acid, but also polybasic acids like citric acid or tartaric acid. It is, however, also possible to use inorganic polybasic acids such as phosphoric acid or boric acid and also their partial esters.

The epoxy resins X have at least two 1,2-epoxy groups and are aliphatic or aromatic. Aliphatic diepoxides are obtainable, for example, by epoxidizing diolefins such as 1,3-butadiene or 1,5-hexadiene, or by reacting epichlorohydrin with dihydroxy compounds such as 1,4-butanediol, 1,6-hexanediol or the oligomeric or polymeric ethylene or propylene glycols. Aromatic diepoxides are obtainable by reacting dihydroxy aromatics such as resorcinol, dihydroxybiphenyl, dihydroxydiphenyl sulfone or dihydroxybenzophenone with epichlorohydrin. Particular preference is given to the reaction products of epichlorohydrin with 2,2-bis(4-hydroxyphenyl)propane or bis (4-hydroxyphenyl)methane (bisphenol A and bisphenol F). In addition to said diepoxides it is also possible to use the glycidyl ethers of trihydric or higher polyhydric alcohols such as trimethylolethane and trimethylolpropane, pentaerythritol, ditrimethylolpropane and dipentaerythritol, and also the ethoxylation and propoxylation products of said alcohols, preference being given to on average at least two and not more than twenty oxyethylene and/or oxypropylene groups for each of the hydroxyl groups of said alcohols. Likewise suitable are glycidyl esters of dihydric or polyhydric organic acids, especially of carboxylic acids such as succinic acid, adipic acid, phthalic acid, isophthalic acid and terephthalic acid, trimellitic acid and trimesic acid, and benzophenonetetracarboxylic acid. The specific epoxide group content of the epoxy resins X used is preferably from 0.6 to 10 mol/kg ("EV value" from 100 to 1670 g/mol), in particular from 1.2 to 6 mol/kg ("EV value" from 167 to 840 g/mol). For the epoxy resins X it is further preferred to select those whose specific epoxide group content SEC (X) is higher than the value SEC (Z) of the epoxy resins Z. In particular, SEC (X):SEC (Z) is from 1.2 to 5, preferably from 1.5 to 4.

The resins ZYX preferably have amine numbers of from 40 to 150 mg/g, and hydroxyl numbers of from 30 to 150 mg/g, based in each case on the mass of the resin solids. Their Staudinger index is preferably between 30 and 100 cm$^3$/g, measured in N-methylpyrrolidone at room temperature (23° C.).

The formerly so-called intrinsic viscosity number, called Staudinger index $J_g$ according to DIN 1342, part 2.4, is the limiting value of the Staudinger function $J_v$ with decreasing concentration and shear stress; $J_v$ being the change in viscosity relative to the mass concentration $\beta_B = m_B/V$ of the dissolved substance B (with the mass $m_B$ of the substance in the volume V of the solution), i.e., $J_v = (\eta_r - 1)/\beta_B$. Here, $\eta_r - 1$ is the relative change in viscosity, where $\eta_r - 1 = (\eta - \eta_s)/\eta_s$. The relative viscosity $\eta_r$ is the ratio of the viscosity $\eta$ of the solution analyzed to the viscosity $\eta_s$ of the pure solvent. (The physical significance of the Staudinger index is that of a specific hydrodynamic volume of the solvated polymer coil at infinite dilution and the state of rest.) The unit commonly used for J is "cm$^3$/g"; formerly often "dl/g".

The amine number "AZ" is defined in accordance with DIN 53 176 as the ratio of that mass $m_{KOH}$ of potassium hydroxide which on neutralization consumes the same amount of acid as a sample under analysis to the mass $m_B$ of said sample (mass of the solid in the sample in the case of solutions or dispersions); its customary unit is "mg/g".

The hydroxyl number "OHZ" is defined in accordance with DIN 53 240 as the ratio of that mass $m_{KOH}$ of potassium hydroxide which has the same number of hydroxyl groups as a sample to be analyzed and the mass $m_B$ of that sample (mass of the solid in the sample in the case of solutions or dispersions); its customary unit is "mg/g".

The resulting dispersions of the resins ZYX in water have mass fractions of solids of from about 20 to about 60%. After drying, on any desired substrates, particularly on metallic substrates such as steel panels, aluminum, galvanized iron panels, phosphated iron panels or on plastics and mineral substrates such as concrete, plaster or stone, they form hard, tough films which possess good chemical resistance and water resistance and good gloss.

The resins ZYX may be used as sole binders in aqueous coating materials, with the use if desired of customary pigments and coating additives such as flow improvers, defoamers, preservatives and coalescence aids. The coating materials may be applied to all of the substrates mentioned and after drying form coatings having good stability and a good corrosion protection effect.

One further aspect of the invention includes replacing the resins ZYX by such modified resins ZYWX which have been modified by inclusion of ethylenically unsaturated carboxylic acids W. This can be effected by first reacting the epoxy resins Z with the unsaturated carboxylic acids W to form hydroxy esters, where the amounts of Z and W have to be chosen such that a part of the epoxide groups remains unreacted, and then reacting these hydroxy esters ZW under consumption of the remaining epoxide groups with the aliphatic amine Y to yield carboxylic acid-modified epoxy amine adducts ZYW. Another way is to react the unsaturated carboxylic acids W with epoxy amine adducts ZY, in which case the amounts of Z and Y have to be chosen such that there remain unreacted epoxide groups in the adduct ZY for reaction with the acids W. The compounds ZYW are then at least partly neutralised, transferred to the aqueous phase and then reacted with further epoxy resin X to form carboxylic acid-modified cationically stabilised water-dilutable epoxy resins ZYWX. These can further be modified by polymerising, in their presence, ethylenically unsaturated monomers V in the presence of radical initiators. Thus, both graft polymers ZYWXV where polymers formed by polymerisation of the monomers V are chemically bound to the epoxy resins ZYWX, and simple mixtures of emulsion polymers made by polymerising the monomers V and the aqueously dispersed epoxy resins ZYWX are obtained. A further embodiment is to polymerise the monomers V without prior modification of the epoxy resin ZYX with the unsaturated carboxylic acids W, in the presence of its aqueous dispersion. In this case, the fraction of graft polymers formed is generally lower.

The unsaturated carboxylic acids W are aliphatic linear and branched carboxylic acids having from 3 to 30 carbon atoms, one carboxylic acid group, and at least one olefinic or ethylenic double bond per molecule. Acrylic acid, methacrylic acid, the monoalkyl esters of maleic and fumaric acids, tetrahydrophthalic acid and other unsaturated dicarboxylic acids can be used, while unsaturated fatty acids like oleic acid, erucic acid, linoleic acid, sorbic acid, linolenic acid, arachidonic acid, and the mixtures of fatty acids obtained from native oils like sunflower oil, ricinene fatty acids, tall oil fatty acid, soy bean oil fatty acid, safflower oil fatty acid, and linseed oil fatty acid.

The monomers V have at least one olefinic unsaturation and may have other reactive groups such as hydroxyl groups (V1) and epoxide groups (V2), or they (V3) do not comprise further reactive groups or only such group s that are not reactive under the usual curing conditions. Monomers V1 having hydroxyl groups are hydroxyalkyl esters, especially hydroxyethyl-, 2- and 3-hydroxypropyl, 2- and 4-hydroxybutyl-, 6-hydroxyhexyl- and 1-hydroxy-2-propylesters of olefinically unsaturated carboxylic acids, especially of acrylic and methacrylic acids, or of monoalkyl esters of olefinically unsaturated dicarboxylic acids like, e.g., hydroxyethyl methyl maleate. Preferred monomers are hydroxyethyl(meth)acrylat and the commercial mixtures of hydroxypropyl (meth)acrylates. Monomers V2 carrying epoxide groups are especially glycidyl esters of olefinically unsaturated carboxylic acids like glycidyl (meth)acrylate oder glycidylmethyl maleate. Preference is given to such monomers V3 carrying no reactive groups other than the olefinic double bond, especially to styrene, the alkyl esters of acrylic and methacrylic acids, such as methyl methacrylate, ethyl (meth)acrylate, n-, iso-, sec.- and tert.-butyl (meth)acrylate, hexyl (meth)acrylate, 2-ethylhexyl (meth)acrylate, vinyl esters of aliphatic linear or branched monocarboxylic acids such as vinyl acetate, vinyl propionate, the vinyl esters of the so-called versatic acids, vinylmethyl ether, as well as vinyl and vinylidene chloride, acrylonitrile und methacrylonitrile.

These modified epoxy resin dispersions are, in the same way as the previously described unmodified epoxy resin dispersions ZYX, suitable as binders for paints, and the coatings thus prepared are also notable for outstanding corrosion protection.

In the examples which follow, as in the text which precedes them, all figures with the unit "%" are mass fractions (ratio of the mass of the substance in question to the mass of the mixture), unless specified otherwise. Concentration figures in "%" are mass fractions of the dissolved substance in the solution (mass of the dissolved substance divided by the mass of the solution).

EXAMPLES

Example 1

Preparation of the Binder 960 g of an epoxy resin based on bisphenol A (SEC=2.08 mol/kg) were dissolved with 105 g of diethanolamine and 65 g of diethylaminopropylamine in methoxypropanol to give a 70% strength solution. The solution was heated to from 95 to 100° C. and was held at this temperature until free epoxide groups were no longer detectable. By addition of acetic acid (50 mmol per 100 g of resin solids, i.e., in this case 33.9 g), the amine groups were neutralized. The neutralized resin solution was diluted with water to give a dispersion having a mass fraction of solids of 35%.

After the aqueous dispersion had been heated to 80° C., 200 g of an epoxy resin based on bisphenol A (SEC=5.26 mol/kg) were added. The mixture was held at from 80 to 95° C. with stirring until epoxide groups were no longer detectable in the reaction mixture. The resin had a Staudinger index of 70 cm$^3$/g, measured in N-methylpyrrolidone at 23° C.

Example 2

Preparation of a Paint

The binder dispersion from example 1 was adjusted to a mass fraction of solids of 33% by addition of deionized water. To 250 g of the resulting dispersion there were added 102 g of titanium dioxide pigment (Kronos ®CL 2000), 46 g of talc (®Microtalc AT Extra from Norwegian Talc) and 23 g of zinc phosphate (®Heukophos ZPO from Heubach) as active pigment, and the mixture was dispersed in a bead mill. The resulting paint was applied at a dry film thickness of 40 µm to an unpretreated steel panel. After drying at room temperature for 24 hours, a Konig pendulum hardness of 97 s was measured. The panel was subjected to a salt spray test (ASTM B 117-64, 120 hours); the scribe creep was 0.5 mm.

It was found that a paint prepared using this binder, without curatives, dries to a hard film in an appropriate time. The corrosion protection effect is excellent.

Example 3

Epoxy Resin Intermediate 1900 g of an epoxy resin based on bisphenol A with a specific epoxy group content of 2.1 mol/kg were dissolved in methoxy propanol, together with 420 g of tall oil fatty acid, 102 g of dimethylamino propylamine and 53 g of diethanol amine to form a 70% strength solution and reacted at 110° C. until the epoxy groups were completely consumed. Then, 60 mmol of acetic acid per 100 g of solid resin were added, and the mixture was diluted to a mass fraction of solids of 40% with fully deionised water. Within 1 hour, 250 g of bisphenol A diglycidyl ether were added to this aqueous solution at 90° C., and the mixture was kept under stirring until no more epoxy groups could be detected. By adding further water, the mixture was diluted to a mass fraction of solids of 30%.

Example 4

1 g of tert.-butyl hydroperoxide was added to 333 g of the epoxy intermediate of Example 3, the mixture was heated to 70° C. Over four hours, a monomer mixture was added at 70° C., consisting of 30 g of styrene, 30 g of 2-ethylhexyl acrylate, 40 g of methyl methacrylate, and 18 g of butyl glycol. Concurrently, a solution of 0.15 g of ascorbic acid dissolved in 35 g of fully demineralised water was added. The temperature was kept constant for one hour at 70° C. Thereafter, a further 0.1 g of ascorbic acid dissolved in 25 g of water were added, the resulting product was stirred for one more hour at 70° C.

The following analytical data were obtained:

| | |
|---|---|
| mass fraction of non-volatiles: | |
| 39.7% | (DIN EN ISO 3251; 1 hour, 125° C.) |
| viscosity: | |
| 120 mPa · s | (DIN EN ISO 3219; 23° C., 100 s$^{-1}$) |

Example 5

1 g of tert.-butyl hydroperoxide was added to 333 g of the epoxy intermediate of Example 3, the mixture was heated to 70° C. Over four hours, a monomer mixture was added at 70° C., consisting of 30 g of styrene, 30 g of 2-ethylhexyl acrylate, 30 g of methyl methacrylate, 10 g of glycidyl methacrylate, and 18 g of butyl glycol. Concurrently, a solution of 0.15 g of ascorbic acid dissolved in 35 g of fully demineralised water was added. The temperature was kept constant for one hour at 70° C. Thereafter, a further 0.1 g of ascorbic acid dissolved in 25 g of water were added, the resulting product was stirred for one more hour at 70° C.

The following analytical data were obtained:

| | |
|---|---|
| mass fraction of non-volatiles: | |
| 39.2% | (DIN EN ISO 3251; 1 hour, 125° C.) |
| viscosity: | |
| 90 mPa · s | (DIN EN ISO 3219; 23° C., 100 s$^{-1}$) |

What is claimed is:

1. A water-dilutable, cationically stabilized epoxy resin ZYWX obtained by multistage reaction of modified epoxide amine adducts ZYW made by reacting aromatic or aliphatic epoxide compounds Z containing at least one epoxide group per molecule with aliphatic amines Y containing at least one primary or secondary amino group and ethylenically unsaturated carboxylic acids W which in turn are converted to epoxy resins ZYWX by at least partial neutralization by addition of acid, conversion into an aqueous dispersion and reaction with epoxide compounds X containing at least two epoxide groups per molecule, the amounts of the epoxide compound X and of the modified epoxy-amine adduct ZYW being chosen such that the number of reactive (in respect of addition reaction with an epoxide group) hydroxyl and/or amino groups in ZYW is at least equal to that of the epoxide groups in X.

2. The epoxy resins ZYWX of claim 1, where the modified epoxy amine adducts ZYW comprise reaction products of aliphatic amines Y with modified epoxy compounds ZW made by reacting aromatic or aliphatic epoxide compounds Z containing at least one epoxide group per molecule with ethylenically unsaturated carboxylic acids W to form hydroxy esters ZW, and then reacting these hydroxy esters ZW under consumption of the remaining epoxide groups with the aliphatic amine Y to yield carboxylic-acid modified epoxy amine adducts ZYW.

3. The epoxy resins ZYWX of claim 1, where the modified epoxy amine adducts ZYW comprise reaction products of ethylenically unsaturated carboxylic acids W with epoxy amine adducts ZY made by reacting aromatic or aliphatic epoxide compounds Z containing at least one epoxide group per molecule with aliphatic anilines Y containing at least one primary or secondary amino group, in which case the amounts of Z and Y are chosen such that there remain unreacted epoxide groups in the adduct ZY for reaction with the acids W.

4. A process for preparing water-dilutable, cationically stabilized epoxy resins ZYWX, which comprises in a first stage reacting aromatic or aliphatic epoxide compounds Z with aliphatic amines Y selected from amines Y1 containing at least one primary amino group and amines Y2 containing no primary amino groups and at least one secondary amino group, and an unsaturated carboxylic acid W to give a modified epoxy amine adduct ZYW, made by reaction of the epoxide compound Z with an unsaturated carboxylic acid W yielding a hydroxy ester ZW that still has unreacted epoxide groups, or by reaction of the epoxy amine adduct ZY which still has unreacted epoxide groups with the carboxylic acid W, than at least partly neutralizing said adduct by addition of acid and converting it into an aqueous dispersion, and then in a second stage carrying out reaction with an epoxide compound X, the amount of X being such that the number of amino and/or hydroxyl groups which are reactive in respect of addition reaction with an epoxide group in ZWY is at least 10% treater than the number of the epoxide groups in X, and which comprises performing the reaction of ZWY and X until epoxide groups are no longer detectable in the reaction mixture.

5. The process as claimed in claim 4, where in a further stage, a radical initiator and one or more ethylenically unsaturated monomers V are added to the aqueous dispersion of the cationically stabilised epoxy resin ZYWX, the ethylenically unsaturated monomers being selected from the group consisting of hydroxy functional monomers V1, epoxy-functional monomers V2, and monomers V3 bearing no other reactive group in addition to the ethylenic unsaturation.

6. An aqueous coating material comprising the modified epoxy resin of claim 1 as binder.

7. The epoxy resin ZYWX of claim 1, wherein the amines Y are selected from amines Y1 containing at least one primary amino group and, if desired, one or more tertiary amino groups and amines Y2 containing at least one secondary amino group, no primary amino groups, and, if desired, one or more hydroxyl groups.

8. The epoxy resin ZYWX of claim 1, wherein the amines Y are mixtures of amines Y1 containing at least one primary amino group and, if desired, one or more tertiary amino groups and amines Y2 containing at least one secondary amino group, no primary amino groups, and, if desired, one or more hydroxyl groups.

9. The epoxy resin ZYWX of claim 1, wherein the epoxide compounds Z are first reacted with an amine Y2 containing at least one secondary amino group and then reacted with an amine Y1 containing at least one primary amino group.

10. The epoxy resin ZYWX of claim 1, wherein the epoxide compounds Z contain two 1,2-epoxy groups.

11. The epoxy resin ZYWX of claim 1, wherein the epoxide compounds Z are derived from bisphenol A or bisphenol F or mixtures thereof.

12. The epoxy resin ZYWX of claim 1, wherein the epoxide compounds X are selected from epoxy resins derived from bisphenol A, bisphenol F, mixtures there of, and also glycidyl ethers of polyhydric alcohols selected from trimethylolethane, trimethylolpropane, pentaerythritol, ditrimethylolethane and -propane and dipentaaerythritol and also their ethoxylation and propoxylation products.

13. The epoxy resin ZYWX of claim 1, wherein the resin has an amine numbers of from 40 to 150 mg/g and a hydroxyl numbers of from 30 to 150 mg/g and its Staudinger index is between 30 and 100 $cm^3/g$ (measured in N-methylpyrrolidone).

* * * * *